(12) United States Patent
Duron et al.

(10) Patent No.: US 7,836,335 B2
(45) Date of Patent: Nov. 16, 2010

(54) COST-REDUCED REDUNDANT SERVICE PROCESSOR CONFIGURATION

(75) Inventors: Mike C. Duron, Pflugerville, TX (US); Mark D. McLaughlin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 12/101,660

(22) Filed: Apr. 11, 2008

(65) Prior Publication Data

US 2009/0259884 A1 Oct. 15, 2009

(51) Int. Cl.
*G06F 11/00* (2006.01)
(52) U.S. Cl. ........................................................ 714/13
(58) Field of Classification Search ............... 714/2–13, 714/15, 16, 20, 21, 23, 24, 31, 37, 38, 47
See application file for complete search history.

(56) References Cited

U.S. PATENT DOCUMENTS

| | | | | |
|---|---|---|---|---|
| 5,774,642 | A * | 6/1998 | Flon et al. | 714/13 |
| 5,815,651 | A * | 9/1998 | Litt | 714/10 |
| 5,884,018 | A * | 3/1999 | Jardine et al. | 714/4 |
| 6,868,479 | B1 * | 3/2005 | Thibault et al. | 711/114 |
| 6,931,568 | B2 * | 8/2005 | Abbondanzio et al. | 714/11 |
| 6,959,344 | B2 | 10/2005 | Murotani et al. | |
| 7,526,639 | B2 * | 4/2009 | Duron et al. | 713/1 |
| 7,725,899 | B2 * | 5/2010 | Safford et al. | 718/104 |
| 2007/0174686 | A1 | 7/2007 | Douglas et al. | |
| 2007/0214386 | A1 * | 9/2007 | Watanabe | 714/13 |
| 2008/0126854 | A1 * | 5/2008 | Anderson et al. | 714/13 |
| 2009/0063901 | A1 * | 3/2009 | Suzuki et al. | 714/25 |

OTHER PUBLICATIONS

A Pipelined Memory Architecture for High Throughput Network Processors, Sherwood et al., (undated).
Lightweight Network Support for Scalable End-to-End Services, Calvert et al., SIGCOMM '02, Aug. 19-23, 2002, Pittsburgh, Pennsylvania, USA, Copyright 2002 ACM 1-58113-570-X/02/0008, pp. 265-278.

* cited by examiner

*Primary Examiner*—Nadeem Iqbal
(74) *Attorney, Agent, or Firm*—Cantor Colburn LLP; Matthew Baca

(57) ABSTRACT

A redundant service processor configuration is provided. A first processor in a first node operates elements in the first node. A first control line connects the first processor to a first multiplexer in the first node. A second processor in a second node operates elements in the second node. A second control line connects the second processor to a second multiplexer in the second node. The first control line from the first processor connects to the second multiplexer. The second control line from the second processor connects to the first multiplexer. In response to a failure of the second processor, the first processor operates the first multiplexer to initialize the elements of the first node, the second processor is switched off, and the first processor operates the second multiplexer to initialize the elements of the second node. Analogous operations occur in response to a failure of the first processor.

3 Claims, 4 Drawing Sheets

COST-REDUCED REDUNDANT SERVICE PROCESSOR CONFIGURATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

This invention relates to redundant service processor configurations, and particularly to cost-reduced configurations for providing redundant service processors.

2. Description of Background

High-end systems have service processors that boot the system and monitor it for problems. To improve boot time, service processors can be added to each node. In addition, adding a redundant service processor to each node will improve reliability. But, this will make the number of service processors add up quickly. Since each service processor has a fully functional processor, memory, and flash memory, the cost of redundancy can be significant.

It would be beneficial to have a cost-reduced mechanism for service processor redundancy.

SUMMARY

In accordance with exemplary embodiments, a redundant service processor configuration is provided. A first processor in a first node operates elements in the first node. A first control line operatively connects the first processor to a first multiplexer in the first node, where the first processor controls the first multiplexer to initialize the elements in the first node. A second processor in a second node operates elements in the second node, and the second node is adjacent to the first node. A second control line operatively connects the second processor to a second multiplexer, where the second processor controls the second multiplexer to initialize the elements in the second node. The first control line from the first processor is connected to the second multiplexer. The second control line from the second processor is connected to the first multiplexer. The first processor is active in the first node and the second processor is active is active in the second node. In response to a failure of the second processor, the first processor operates the first multiplexer to initialize the elements of the first node, the second processor is switched off, and the first processor operates the second multiplexer to initialize the elements of the second node. In response to a failure of the first processor, the second processor operates the second multiplexer to initialize the elements of the second node, the first processor is switched off, and the second processor operates the first multiplexer to initialize the elements of the adjacent first node.

Additional features are realized through the techniques of the present invention. For a better understanding of exemplary embodiments, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features of the invention are apparent from the following detailed description taken in conjunction with the accompanying drawings in which:

The detailed description explains exemplary embodiments of the invention, together with advantages and features, by way of example with reference to the drawings.

DETAILED DESCRIPTION OF EXEMPLARY EMBODIMENTS

Exemplary embodiments provide a mechanism to reduce the number of service processors required, while keeping full redundancy. This is accomplished by using the neighboring node's service processor as the redundant one according to exemplary embodiments.

Figure 1:
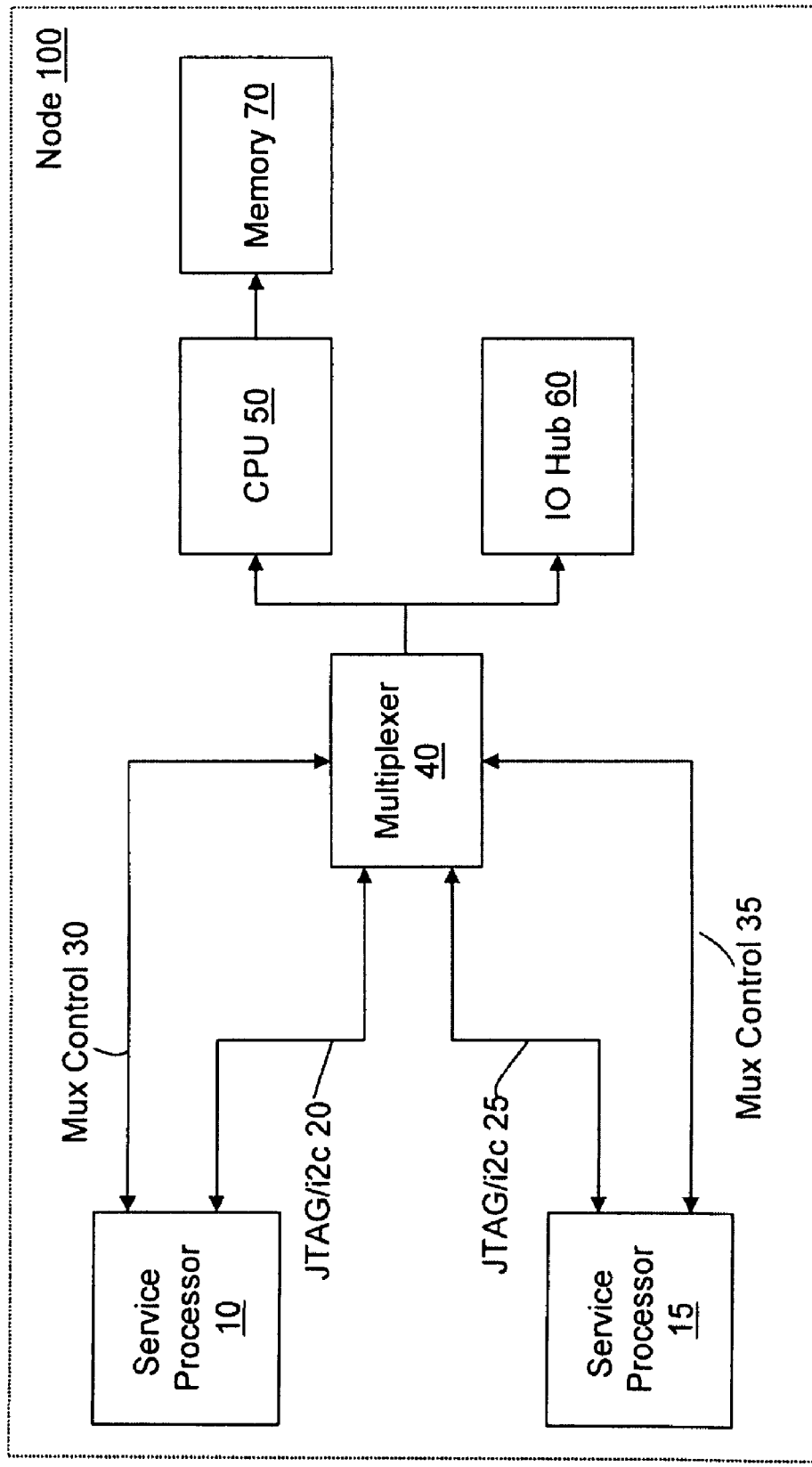
FIG. 1 illustrates a typical redundant service processor configuration with multiplexers and illustrates respective JTAG/i2c paths.

FIG. 1 illustrates a typical redundant service processor configuration with multiplexers and illustrates respective JTAG/i2c paths. The typical design has two service processors 10 and 15 in each and every node 100. Each service processor has a JTAG or i2c connection to a multiplexer chip. For example, the service processor 10 connects to a multiplexer chip 40 via a JTAG/i2c connection 20, and the service processor 15 connects to the multiplexer chip 40 via a JTAG/i2c connection 25. Also, the service processor 10 and the service processor 15 are connected to the multiplexer chip 40 via multiplexer control lines 30 and multiplexer control lines 35, respectively. The multiplexer chip 40 is controlled by control inputs connected to the service processors 10 and 15 via the multiplexer control lines 30 and 35, respectively.

The service processors 10 and 15 perform a handshake with each other to determine which one is the primary service processor (active) and which one is the redundant service processor (passive). Once this is determined, the primary service processor (e.g., the service processor 10) sets the multiplexer control and initializes the chips (such as a CPU 50, memory 70, and input/output hub 60) in the system/node 100. The redundant service processor (e.g., the service processor 15) is idle and does nothing during normal operation of the node 100.

However, exemplary embodiments can utilize only one service processor in each node and have the service processor in the neighboring node serve as the redundant one. In exemplary embodiments, each service processor may be a primary for its node and a backup for the neighboring node. This approach may require the addition of either an external cable or wiring through the node interconnect to carry the JTAG and control signals to the next node, in accordance with exemplary embodiments.

Figure 2:
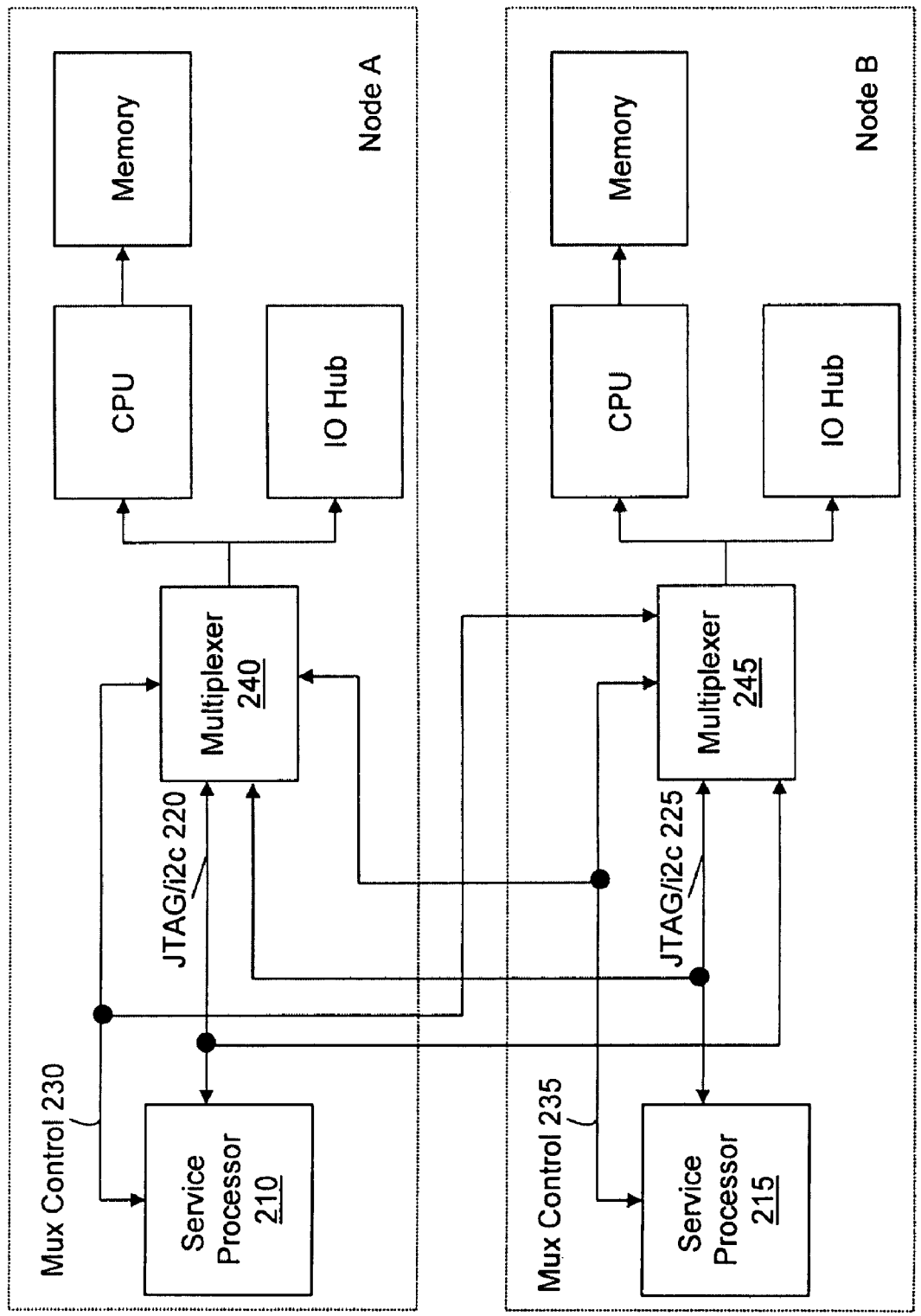
FIG. 2 illustrates an example of a cost-reduced redundancy configuration using the next node in accordance with exemplary embodiments.

FIG. 2 illustrates an example of a cost-reduced redundancy configuration using the next node (which may be an adjacent node) in accordance with exemplary embodiments. FIG. 2 illustrates the paths necessary to make each service processor both a primary service processor for the local node and a redundant service processor for the adjacent node in accordance with exemplary embodiments.

Node A may include a service processor 210 operatively connected to a multiplexer 240 via multiplexer control line 230. The service processor 210 is also operatively connected to the multiplexer 240 via JTAG/i2c connection 220. The multiplexer 240 is operatively connected to other elements such as a computer processing unit (CPU) that is in turn connected to memory, and the multiplexer 240 is operatively connected to an input/output hub.

Node B may include a service processor 215 operatively connected to a multiplexer 245 via multiplexer control line 235. The service processor 215 is also operatively connected to the multiplexer 245 via JTAG/i2c connection 225. The multiplexer 245 is operatively connected to other elements such as a computer processing unit (CPU) that is in turn connected to memory, and the multiplexer 245 is operatively connected to an input/output hub.

In accordance with exemplary embodiments, the service processor 210 in node A is operatively connected to the multiplexer 245 in node B, and the service processor 210 may serve as a backup to the service processor 215. Likewise, the service processor 215 in node B is operatively connected to the multiplexer 240, and the service processor 215 may serve as a backup to the service processor 210.

Figure 3:
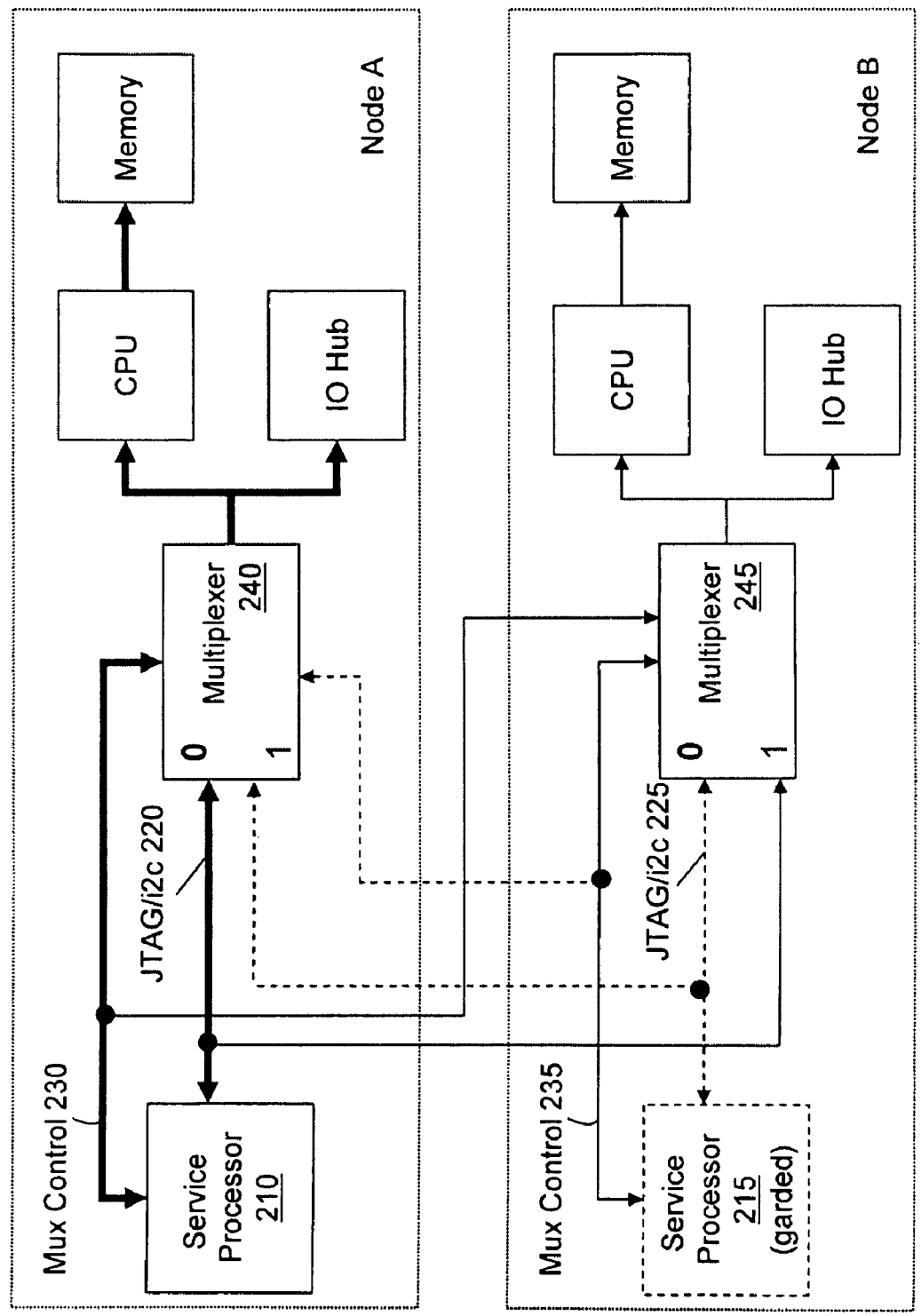
FIG. 3 illustrates control and operation flow in a cost-reduced redundancy configuration using the next node in accordance with exemplary embodiments.

FIG. 3 illustrates the control and operation flow in the cost-reduced redundancy configuration using the next node (or adjacent node) in accordance with exemplary embodiments. FIG. 3 illustrates the operational flow when one of the service processors is in a failed (garded) state. A garded state represents a resource that is offline. The good service processor initializes the local node by first setting the multiplexer control lines, and then initializes the chips in its own node.

As a non-limiting example, the service processor 215 is in a failed (garded) state in node B. In node A, the service processor 210 controls the multiplexer 240 via the multiplexer control line 230 to initialize the elements of node A, such as the CPU, IO hub, and memory. The JTAG/i2c connector 220 is in operation and is connected multiplexer 240. Likewise, analogous operations may occur for the service processor 215, if the service processor 215 were not in a failed state. The JTAG/i2c connector 220 is used to scan initialization values into chips (such as the CPU, memory, and IO hubs), but the JTAG/i2c connector 220 is not needed for the multiplexer 240 and is passed through on the multiplexer 240.

Figure 4:
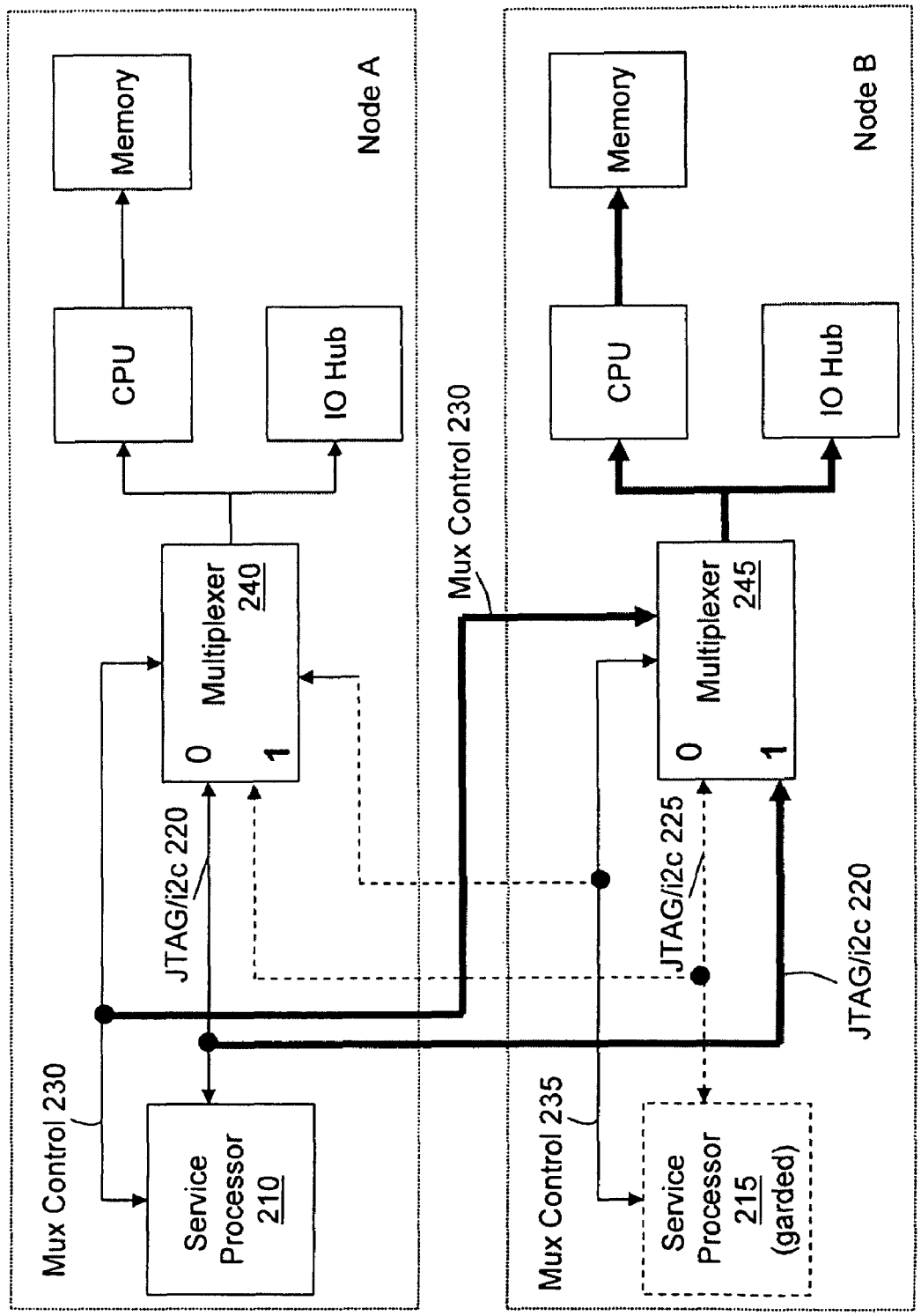
FIG. 4 illustrates accessing the next node with a redundant service processor in accordance with exemplary embodiments.

FIG. 4 illustrates the next node accessing with a redundant service processor in accordance with exemplary embodiments. After the service processor 210 is finished initializing its node A, the service processor 210 sets the multiplexer 245 in order to talk to the adjacent node B. As a non-limiting example of FIGS. 3 and 4, the service processor 210 sets the control line for both multiplexers 240 and 245 to the same value (both multiplexer controls are the same signal). Due to the way it is connected, whenever the Mux control=0, Node A is selected, so the JTAG/i2c line 220 is sent through the multiplexer 240 in Node A and to the CPU, memory, and IO hub in Node A. When the Mux control=1, the JTAG/i2c line 220 is sent through the multiplexer 245 in Node B and passed to the CPU, memory, and IO hub in Node B. The service processor 210 initializes the node B by controlling the multiplexer 245 via the multiplexer control line 230. The Mux controls, which can be set to 0 or 1, control which JTAG input to send to the output.

As a non-limiting example, during normal operation, the service processor 210 in the node A will program the multiplexer 240 to use the local service processor 210 according to exemplary embodiments. If a service processor (e.g., the service processor 215) fails, the failed service processor 215 will be garded out and soft-switched off. Since the failed service processor 215 is powered off, there will be no chance of interference on the buses. The redundant service processor 210 in the node A will initialize its own node A, and then the redundant service processor 210 switches the multiplexers 240 and 245 in both nodes A and B to their alternate inputs. By switching to the alternate inputs in the multiplexers 240 and 245, this will block the local node A from receiving signals intended for the next node B. The service processor 210 can then initialize the next node B. So, the multiplexer switching (of multiplexers 240 and 245) allows the service processor 210 to talk to either the local node A or next node B without sending signals to the wrong target.

Further, exemplary embodiments provide a cost-saving idea for independent service processors, in which both service processors (e.g., in node A and node B) are active at the same time. Each service processor is responsible for initializing a separate node, such as a set of processors and memory under the service processor. This can improve the initialization time for a system and collect data faster. In addition, in a scenario having node A and node B, both service processors are completely redundant without adding extra cost of third and fourth service (secondary) processors which would be passive, which wait until the primary processor fails. In other words, the typical redundant service processor configuration of FIG. 1 has one active service processor (e.g., the service processor 10) and one passive service processor (e.g., the service processor 15) that waits for a failure to the active service processor. However, exemplary embodiments can remove the passive, redundant service processor and allow this role to be accomplished by the next node (e.g., adjacent node). Note that the next node does not have to be limited in proximity and the next node may be considered any node having a service processor that serves as a backup in accordance with exemplary embodiments. Also, exemplary embodiments allow both service processors to be active all the time, and initialization performance is not lost.

Although non-limiting examples have been provided using nodes A and B, it is understood that a plurality of nodes may be included for a plurality of processors in accordance with exemplary embodiments.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A redundant service processor configuration, comprising:
   a first processor in a first node for operating elements in the first node;
   a first control line operatively connecting the first processor to a first multiplexer in the first node, wherein the first processor controls the first multiplexer to initialize the elements in the first node;
   a second processor in a second node for operating elements in the second node, the second node being adjacent to the first node;
   a second control line operatively connecting the second processor to a second multiplexer, wherein the second processor controls the second multiplexer to initialize the elements in the second node;
   the first control line from the first processor being connected to the second multiplexer;
   the second control line from the second processor being connected to the first multiplexer;
   wherein the first processor is active in the first node and the second processor is active is active in the second node;
   wherein in response to a failure of the second processor:
      the first processor operates the first multiplexer to initialize the elements of the first node;
      the second processor is switched off;
      the first processor operates the second multiplexer to initialize the elements of the second node;
   wherein in response to a failure of the first processor:
      the second processor operates the second multiplexer to initialize the elements of the second node;
      the first processor is switched off;
      the second processor operates the first multiplexer to initialize the elements of the adjacent first node.

2. The configuration of claim 1, wherein in response to the failure of the second processor, an input of the second multiplexer is switched in order to receive input from the first control line connected to the first processor; and
   wherein in response to the failure of the first processor, an input of the first multiplexer is switched in order to receive input from the second control line connected to the second processor.

3. The configuration of claim 1, wherein a plurality of processors are respectively in a plurality of nodes;
   wherein respective ones of the plurality of nodes are adjacent nodes;
   wherein the plurality of processors respectively serve as backups for each others;
   wherein in response to a failure of processors of the plurality of processors, other processors of the plurality of processors backup the failed processors of the plurality of processors.

* * * * *